Aug. 5, 1958     C. P. MIDGLEY     2,845,722
TESTING UNIT PROVIDING A TEACHING AID FOR THE
DEMONSTRATION OF CHEMISTRY
EXPERIMENTS TO STUDENTS
Filed Jan. 20, 1956
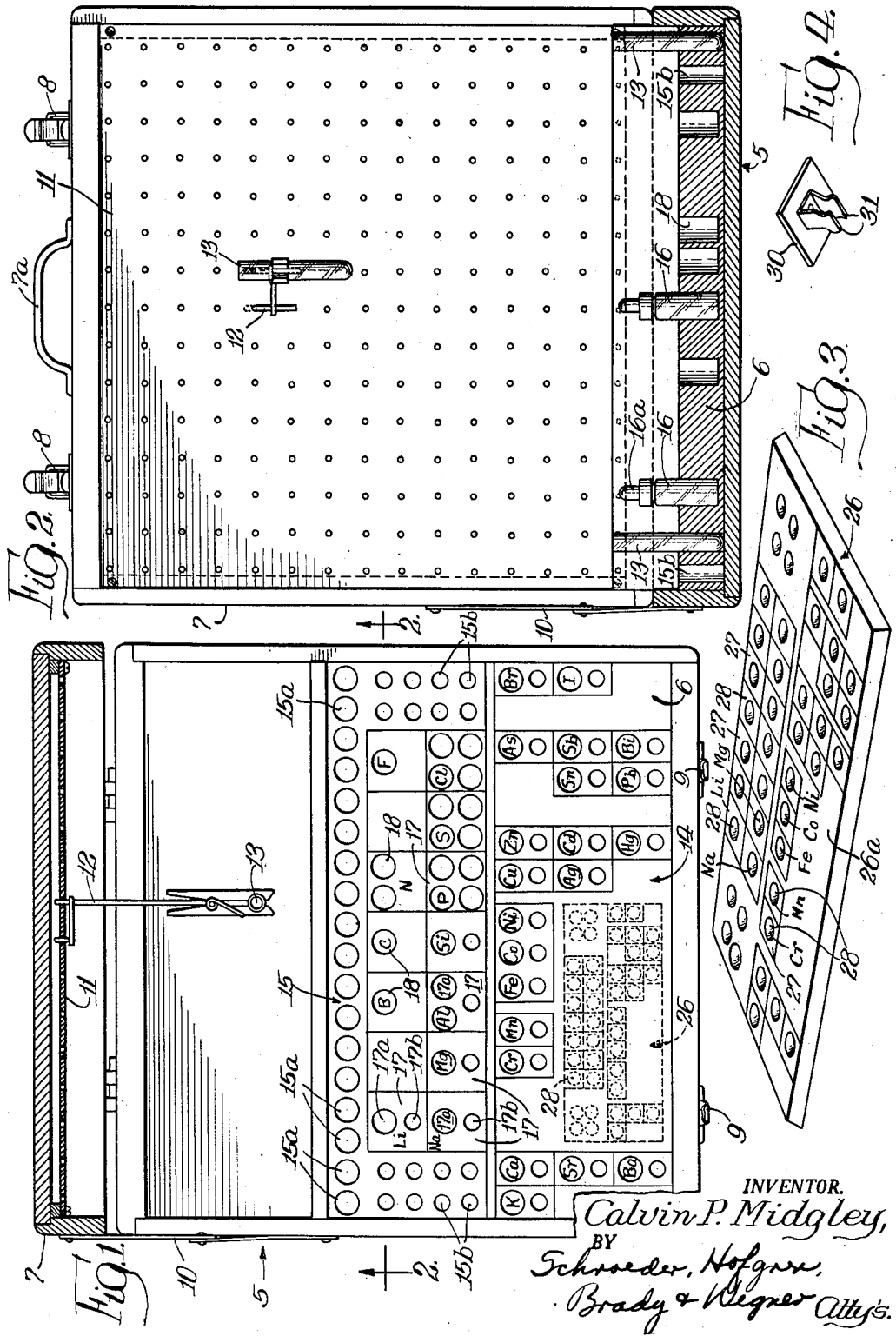
INVENTOR.
Calvin P. Midgley,
BY
Schroeder, Hofgren,
Brady & Wegner Attys.

United States Patent Office
2,845,722
Patented Aug. 5, 1958

2,845,722

TESTING UNIT PROVIDING A TEACHING AID FOR THE DEMONSTRATION OF CHEMISTRY EXPERIMENTS TO STUDENTS

Calvin P. Midgley, Lake Villa, Ill.

Application January 20, 1956, Serial No. 560,309

12 Claims. (Cl. 35—18)

This invention relates to a testing unit which serves as a teaching aid in the demonstration of chemistry experiments to students.

The principal object of the invention is to present to beginning chemistry students a series of simple analytical experiments under conditions which associate an element in a compound with a qualitative test for the element and with the position of the element in the periodic table.

A further object of the invention is to provide a chemical testing unit the arrangement of which is such that a qualitative test for the presence of a particular element in a simple compound may be performed at a location on a testing board which coincides with the position of the element in the periodic table.

Yet another object of the invention is to provide such a testing unit in which a small supply of a compound containing a particular element is kept in the base member of the testing unit at a location which coincides with the position of the particular element in the periodic table.

Still another object of the invention is to provide a testing device as a teaching aid which is marked out into a number of separate spaces each of which represents a selected element in the periodic table, and to provide in a single testing unit a particular group of elements which may properly be treated together in the teaching of elementary chemistry. A series of different testing units may be used for teaching the recognition, testing and simple characteristics of different groups of elements, and at the same time to associate with each element its position in the periodic table.

The use of the device of the present invention for conducting chemistry experiments contemplates that each student will be provided with a testing unit which is marked off into element spaces for the several elements which may be discussed in a single portion of an elementary chemistry course. Each element space has a small storage vessel in which is kept a supply of a compound of the element the position of which in the periodic table coincides with the position of the element space on the testing unit. Immediately adjacent the storage vessel in the element space is a holder to receive a small size test tube in which a sample of the particular compound may be placed for the carrying out of qualitative analytical experiments on the compound.

A related piece of testing equipment is a small ceramic plate which has a group of recesses in its surface which are arranged to coincide with the positions of the elements which are contained in the storage vessels previously referred to. Thus, experiments may also be performed in the small recesses in the ceramic member; and again each experiment is performed in a position which corresponds to the position in the periodic table of the particular element which is being tested. Preferably the large testing unit which contains the storage vessels and the spaces for test tubes has an open area at one place which is large enough to receive the ceramic testing member, and is provided with a latching closure and handle so the unit may be carried like a small suitcase.

The testing unit of the present invention is illustrated in a preferred embodiment in the accompanying drawings in which:

Fig. 1 is a plan view partly in section of a testing unit constructed in accordance with the invention;

Fig. 2 is a section taken as indicated along the line 2—2 of Fig. 1;

Fig. 3 is a perspective view of a ceramic testing base constructed in accordance with the invention; and Fig. 4 is a perspective view of a masking clip for use with the testing unit of Fig. 1.

Referring to the drawings in greater detail, and referring first to Figs. 1 and 2, a testing unit indicated generally at 5 is provided with a base member 6 and a hinged closure 7, the base member and closure being provided with suitable fasteners 8 and 9 and a folding brace 10 for the closure so that the testing unit may be handled as a carrying case or may be positioned with the base member 6 on a table and the closure 7 in an upright position as seen in the drawings. The inner surface 11 of the closure 7 preferably is in the form of a peg board to receive and support suitable removable racks 12 each of which may support a small size test tube 13 so that a test tube may be temporarily clipped to the peg board if, for example, a particular test requires that the test tube be heated.

The base member 6 is divided generally into an element storage and test area indicated generally at 14 and a supply storage area indicated generally at 15. The supply storage area 15 is provided with a plurality of holes, such as the holes 15a, each of which is adapted to receive a storage vessel, such as the storage vessel 16 seen in Fig. 2, to hold suitable reagents. The supply storage area is also provided with holes 15b to receive a supply of test tubes such as the test tube 13. A comparison of the height of the test tube 13 and storage vessel 16 with the depth of the closure member 7 as seen in Fig. 1 shows that when the closure is in its closed position with the latches 8—9 engaged the test tube 13 and storage vessel 16 are held in place by the closure so that the device may be carried by a handle 7a, making it a convenient portable testing unit.

The element storage and testing area 14 of the base member 6 is divided into a plurality of element spaces 17 each of which serves as a marked element testing and storage space. As seen in Fig. 1, each of the element testing and storage spaces 17 occupies a position which coincides with the position in the periodic table of one of a group of selected elements which are indicated in the element spaces of Fig. 1 by their chemical symbols. Thus, for example, the element testing and storage space 17 in the upper left-hand corner of the area 14 occupies the position of the element lithium in the periodic table, and is marked with the chemical symbol "Li." The element testing and storage space for lithium is provided with a storage recess 17a and a testing recess 17b to receive, respectively, a storage vessel such as the vessel 16 and a test tube 13.

Due to the simplicity of using ionic solutions of elements for various tests, the storage vessels 16 preferably take the form of small bottles provided with medicine dropper caps 16a from which any desired quantity of the particular ionic solution contained in the storage vessel may be put in a test tube.

The testing unit illustrated in the drawings is for the purpose of teaching the positions in the periodic table of the various common metallic elements such as lithium, sodium, magnesium, and the others which are identified in Fig. 1. It will be noted that the first row of elements which includes lithium also contains spaces for boron, carbon, nitrogen and fluorine. Since the particular test unit here shown is for the performance of tests for the presence of the metallic ions, the positions for the four last-named elements are only provided with storage openings 18 in which, if desired, suitable reagents containing those elements may be stored. In order to simplify the layout of the testing unit the elements in any group which are not to be discussed in any particular unit of work may be eliminated from the base member, leaving blank spaces; and the same may be true of the elements boron, carbon, nitrogen and fluorine if it is desired to simplify the testing unit still further. It will be noted that the element spaces 17 for the elements phosphorous, sulphur and chlorine are provided with four storage openings 18. This is an alternate arrangement which is shown merely for purposes of illustration, and may be desirable where several different compounds of a particular element are needed for use as reagents or to test for the presence of the element. Similarly, the element space 17 for aluminum has two storage openings 17a, one of which may be used for a supply of an ionic solution and the other for a supply of a dry salt; or two different aluminum compounds may be stored.

Fig. 5 illustrates a type of masking member 30 which may be used to mask any element space which is not in use for a particular unit of work. The prongs 31 may be seated in the storage recess 17a and the testing recess 17b of an element space such as the space for lithium, to mask off the space. This permits a single testing unit to be used in a variety of different situations. Obviously the arrangement of prongs 31 may be varied to fit various arrangements of holes in the element spaces, so that the masking clip 30 in any case fits the space to be masked.

The use of the testing unit as a teaching aid is believed to be clear from the foregoing description. Each of the element testing and storage spaces, such as the space marked for lithium, is provided with a storage vessel 16 containing an ionic solution of the particular selected element which is included in the group being taught. Suitable reagents from the reagent storage vessels may be selected to perform the various common qualitative analytical tests for the presence of the particular elements which are being studied. The position of a particular metallic element in the periodic table is quickly associated in the student's mind with the location of the storage vessel containing the ionic solution of that particular element, and the association of the element with the particular test as well as with the position in the periodic table is still more firmly fixed by reason of the fact that the tests are performed upon samples each of which is contained in a test tube 13 located in the same element storage and testing area in which the supply of the particular element is kept.

For any tests which require heat a test tube rack 12 may be positioned on the peg board 11 above and behind the particular element being tested, so that even in this work it is possible to associate to some degree the position of the material being tested with the location of the element in the periodic table.

As previously stated, ionic solutions of the metallic elements are preferred for most purposes; but there are some situations in which it is desirable to test dry compounds of the elements. In this situation the ionic solutions may be removed and suitable containers of the dry compounds may be substituted in the element storage spaces; or if desired all the element spaces 17 may be arranged like the one shown for aluminum, so that supplies both of the solution and the salt may be kept.

Certain types of tests may better be performed in small open test vessels than in a test tube; and for this type of test it is preferable to use a ceramic unit 26 of the type shown in Fig. 3. The unit 26 has a top surface 26a which is glazed and fired so that it is chemically inert and non-porous. The glazed top surface 26a is provided with a plurality of element testing spaces 27 each of which coincides with a space in the periodic table; and each space has a test recess 28. Each of the element testing spaces 28 of the ceramic member 26 may be used by a student for the performance of a test or tests for the presence of the particular element the position of which in the periodic table coincides with the position of the particular testing space 27 on the ceramic base. As indicated by the broken lines in Fig. 1, the ceramic base 26 may be placed in an open area of the base member 6 which is left by reason of the elimination from the testing unit 5 of a group of elements which are not under consideration in the particular work being done, so that each testing space 27 of the ceramic testing member 26 is used directly in conjunction with the element storage vessel 16 which is in the corresponding element space 17 of the base member 6.

The foregoing detailed description is given for clearness of understanding only and no unnecessary limitations are to be understood therefrom, as some modifications will be obvious to those skilled in the art.

I claim:

1. As a chemistry teaching aid, a portable testing unit for testing compounds of a plurality of selected elements for the presence in each compound of one of said selected elements, said testing unit comprising: a base member having a plurality of marked element testing and storage spaces, each of which is in a position on said base member which coincides with the position in the periodic table of one of said selected elements; a storage vessel in each of said spaces containing a supply of a compound of said one of said selected elements; and means adjacent the container in each of said element spaces for receiving and holding a test tube containing a test sample taken from said vessel.

2. The device of claim 1 in which the storage vessels and test tubes are removable, and the testing unit is provided with a hinged closure which has a closed position substantially abutting the tops of the containers in said testing spaces to retain said containers in place when the testing unit is positioned with the base member in an upright or in an inverted position.

3. The device of claim 1 which includes a plurality of masking members, each of which is adapted to mask an element space when said space is not in use.

4. As a chemistry teaching aid, a portable testing unit for testing compounds of a plurality of selected elements for the presence in each compound of one of said selected elements, said testing unit comprising: a base member having a plurality of marked element testing and storage spaces, each of which is in a position on said base member which coincides with the position in the periodic table of one of said selected elements, each testing space having a first hole to receive and retain a storage vessel containing a compound of said selected element and having a second hole to receive and retain a test tube containing a test sample taken from said vessel.

5. As a chemistry teaching aid, a portable testing unit for testing compounds of a plurality of selected elements for the presence in each compound of one of said selected elements, said testing unit comprising: a base member having a plurality of marked element testing and storage spaces, each of which is in a position on said base member which coincides with the position in the periodic table of one of said selected elements, each of said spaces being provided with a hole to receive and retain a test tube containing a test sample of a compound of said one of said selected elements; and a storage vessel in each space containing a supply of said compound.

6. As a chemistry teaching aid, a testing unit for testing compounds of a plurality of selected elements for the presence in each compound of one of said selected elements, said testing unit comprising: a base member having a plurality of marked element spaces each of which is in a position on said base member which coincides with the position in the periodic table of one of said selected elements; a storage vessel in each of said element spaces containing a supply of a compound of said one of said selected elements; and means for testing each compound for the presence of said one element in a test space the position of which also coincides with the position in the periodic table of said one element.

7. As a chemistry teaching aid, a testing unit for testing compounds of a plurality of selected elements for the presence in each compound of one of said selected elements, said testing unit comprising: a base member having a plurality of marked element testing spaces the position of which coincides with the position in the periodic table of one of said selected elements; and test recess means associated with each of said element testing spaces for receiving a test sample of a compound, whereby said sample may be tested in said recess means for the presence of said selected element.

8. As a chemistry teaching aid, a testing unit for testing compounds of a plurality of selected elements for the presence in each compound of one of said selected elements, said testing unit comprising: a base member having a plurality of marked element testing spaces the position of which coincides with the position in the periodic table of one of said selected elements; and means associated with each of said element testing spaces for receiving a test sample of a compound, whereby said sample may be tested for the presence of said selected element in the testing space for said element.

9. The device of claim 8 in which the testing unit is provided with a chemically inert, non-porous surface, and each testing space has a recess in which a test may be performed.

10. The device of claim 8 in which said means is adapted to receive and hold a test tube containing a sample of a compound to be tested.

11. The device of claim 8 in which each testing space has a hole to receive and hold a test tube containing a sample of a compound to be tested.

12. As a chemistry teaching aid, a testing unit for testing compounds of a plurality of selected elements for the presence in each compound of one of said selected elements, said testing unit comprising: a rigid base member having an integral upper surface which is divided into a plurality of marked element testing spaces the position of each of which coincides with the position in the periodic table of one of said selected elements, said testing unit having a chemically inert, non-porous surface, and each testing space having a recess in which a test may be performed for determining the presence in a compound of said one of said selected elements.

No references cited.